(12) United States Patent
Byquist et al.

(10) Patent No.: US 9,354,668 B2
(45) Date of Patent: May 31, 2016

(54) HINGE ASSEMBLY

(71) Applicants: Tod A. Byquist, Federal Way, WA (US); Peter Bristol, Seattle, WA (US); Michael S. Brazel, Fedeal Way, WA (US); Kristin L. Weihl, Dupont, WA (US); Stella Latscha, Porland, OR (US); Alexander D. Williams, DuPont, WA (US); Nicolas Kurczewski, Dupont, WA (US); Barry T. Dale, DuPont, WA (US); Robert R. Atkinson, Jr., Chandler, AZ (US); Stephen J. Allen, Santa Clara, CA (US); Patrick S. Johnson, Olympia, WA (US)

(72) Inventors: Tod A. Byquist, Federal Way, WA (US); Peter Bristol, Seattle, WA (US); Michael S. Brazel, Fedeal Way, WA (US); Kristin L. Weihl, Dupont, WA (US); Stella Latscha, Porland, OR (US); Alexander D. Williams, DuPont, WA (US); Nicolas Kurczewski, Dupont, WA (US); Barry T. Dale, DuPont, WA (US); Robert R. Atkinson, Jr., Chandler, AZ (US); Stephen J. Allen, Santa Clara, CA (US); Patrick S. Johnson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,285

(22) PCT Filed: Jul. 30, 2013

(86) PCT No.: PCT/US2013/052752
§ 371 (c)(1),
(2) Date: Dec. 13, 2013

(87) PCT Pub. No.: WO2015/016839
PCT Pub. Date: Feb. 5, 2015

(65) Prior Publication Data
US 2015/0227174 A1    Aug. 13, 2015

(51) Int. Cl.
*G06F 1/16*    (2006.01)
*E05D 11/08*    (2006.01)

(52) U.S. Cl.
CPC .............. *G06F 1/1681* (2013.01); *E05D 11/08* (2013.01); *G06F 1/162* (2013.01); *G06F 1/1618* (2013.01); *G06F 1/1679* (2013.01); *Y10T 16/5403* (2015.01)

(58) Field of Classification Search
CPC .............................. G06F 1/1681; G06F 1/1615
USPC ......................................... 361/679.55; 16/337
See application file for complete search history.

(56) References Cited

U.S. PATENT DOCUMENTS 4,859,092 A * 8/1989 Makita ...................... B41J 3/36
                                                              248/921
6,262,885 B1 * 7/2001 Emma ................... G06F 1/1618
                                                              361/679.05

(Continued)

FOREIGN PATENT DOCUMENTS

| JP | 2013-513192 A | 4/2013 |
| KR | 10-2012-0109212 A | 10/2012 |
| WO | 2011/112505 A2 | 9/2011 |

OTHER PUBLICATIONS

International Search Report and Written Opinion received for PCT Patent Application No. PCT/US2013/052752, mailed on Apr. 29, 2014, 12 pages.

*Primary Examiner* — Tuan T Dinh
*Assistant Examiner* — Mukund G Patel
(74) *Attorney, Agent, or Firm* — Alpine Technology law Group LLC

(57) ABSTRACT

In one embodiment chassis for an electronic device comprises a first section and a second section and an assembly to connect the first section of the chassis to the second section of the chassis for an electronic device, comprising a first hinge assembly to be coupled to the first section of the chassis for the electronic device, a second hinge assembly to be coupled to the second section of the chassis for the electronic device, a first rigid connecting member to be coupled to the first hinge assembly and the second hinge assembly, a first resistance element to provide a first rotational resistance between the first hinge assembly and a first end of the first rigid connecting member and a first resistance element to provide a second rotational resistance between the second hinge assembly and a second end of the first rigid connecting member. Other embodiments may be described.

18 Claims, 15 Drawing Sheets

(56) References Cited

U.S. PATENT DOCUMENTS

| | | | |
|---|---|---|---|
| 6,392,877 B1 * | 5/2002 | Iredale | G06F 1/1616 248/551 |
| 7,724,511 B2 * | 5/2010 | Jacobs | G06F 1/1681 361/679.05 |
| 2008/0197095 A1 | 8/2008 | Spitsbergen | |
| 2011/0012858 A1 * | 1/2011 | Brookes et al. | G06F 1/162 345/173 |
| 2011/0151947 A1 | 6/2011 | Griffin et al. | |
| 2013/0175421 A1 | 7/2013 | Faulk et al. | |

* cited by examiner

HINGE ASSEMBLY

BACKGROUND

The subject matter described herein relates generally to the field of electronic devices and more particularly to one or more hinge assemblies which may be used with electronic devices.

Some electronic devices utilize a notebook chassis. By way of example, many portable computers (e.g. traditional laptop, detachable, or convertible) and mobile electronic devices utilize a notebook chassis in which a keyboard is disposed on a first section and a display is disposed on a second section which is coupled to the first section by a hinge. Alternatively, a "clamshell" style laptop can consist of displays, e.g. at least one display on a first section and possibly one or more displays, that can also be utilized as a touch keyboard, on a second section coupled to the first section by a hinge.

The advent of tablet computers has driven a market for laptop devices that are convertible between a traditional notebook and a tablet configuration. Accordingly hinge assemblies which enable a clamshell chassis to convert between configurations may find utility.

BRIEF DESCRIPTION OF THE DRAWINGS

The detailed description references the accompanying figures.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
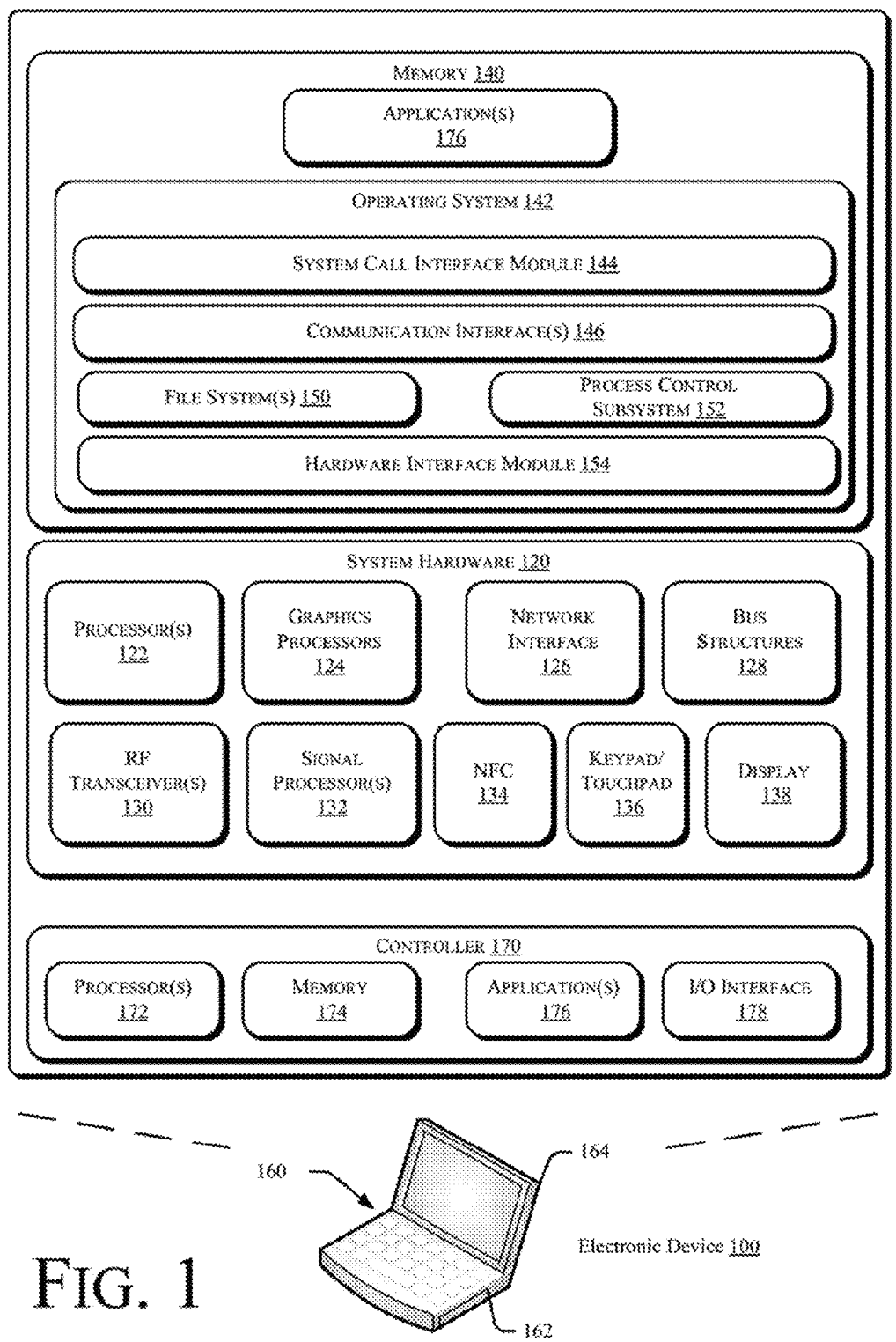
FIG. 1 is a schematic illustration of an exemplary electronic device which may include a hinge assembly in accordance with some embodiments.

FIG. 1 is a schematic illustration of an exemplary electronic device 100 which may be adapted to include a hinge assembly which manages the rotation of a display on a notebook chassis having a first section 160 and a second section 162 in accordance with some embodiments. As illustrated in FIG. 1, electronic device 100 may be embodied as a conventional portable device such as a laptop computer, a mobile phone, tablet computer portable computer, or personal digital assistant (PDA). The particular device configuration is not critical.

In various embodiments, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage, devices. The file store may also be external to electronic device 100 such as, e.g., one or more external hard drives, network attached storage, or a separate storage network.

System, hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processors) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interlace such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RE transceiver 130, RF transceiver may implement a local wireless connection via a protocol such as, e.g., Bluetooth or 802.11X. IEEE 802.11a, b, g or n-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Vex. 3.0.1, December 2002).

Electronic device 100 may further include one or more input/output interfaces such as, e.g., a keypad 136 and a display 138. In some embodiments electronic device 100 may not have a keypad and use the touch panel for input.

Memory 140 may include an operating system 142 for managing operations of electronic device 100. In one embodiment, operating system 342 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some embodiments an electronic device may include a controller 170, which may be separate from the primary execution environment. The separation may be physical in the sense that the controller may be implemented in controllers which are physically separate from the main processors. Alternatively, the separation may logical in the sense that the controller may be hosted on same chip or chipset that hosts the main processors.

By way of example, in some embodiments the controller 170 may be implemented as an independent integrated circuit located on the motherboard of the electronic device 100, e.g., as a dedicated processor block on the same SOC die. In other embodiments the controller 170 may be implemented an a portion of the processor(s) 122 that is segregated from the rest of the processor(s) using hardware enforced mechanisms In the embodiment depicted in FIG. 1 the controller 170 comprises a processor 172, a memory module 174, a control module 176, and an I/O interlace 178. In some embodiments the memory module 174 may comprise a persistent flash memory module and the various functional modules may be implemented as logic instructions encoded in the persistent memory module, e.g., firmware or software. The I/O interface 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122.

In some embodiments the electronic device 100 may comprise an assembly 200 to connect a first section 162 of a chassis 160 for an electronic device 100 to a second section 164 of a chassis 160 for an electronic device 100. Embodiments of assemblies 200 will be described with reference to FIGS. 2A-2G, 3A-3B, 4, and 5A-5D.

Figure 2A:
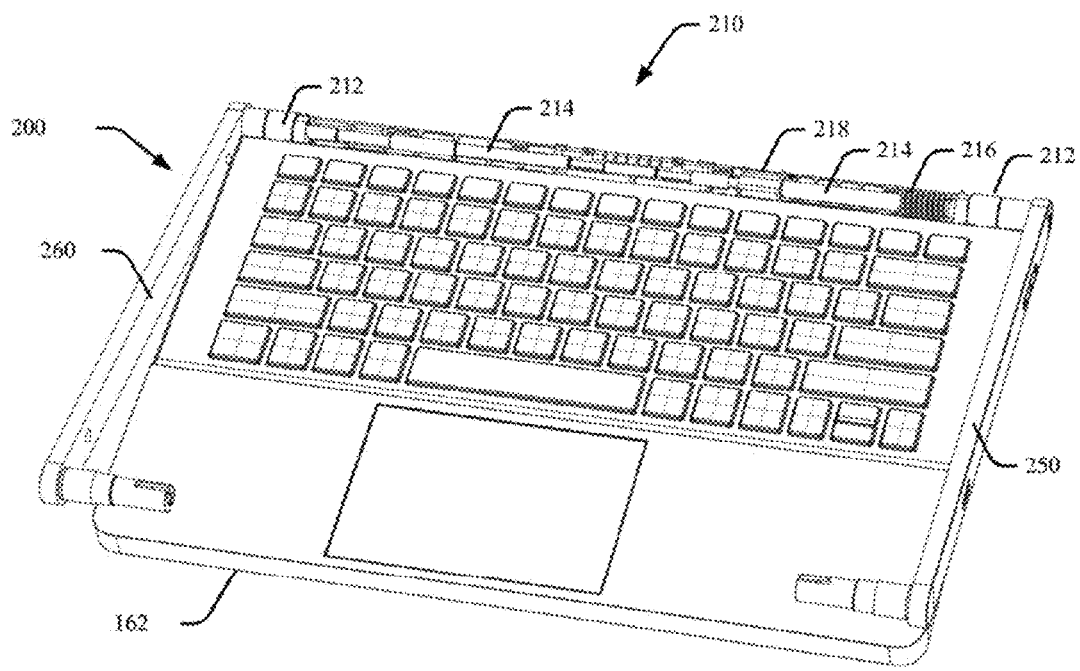
FIGS. 2A-2B and 3A-3H are schematic illustrations of electronic devices which include assemblies in accordance with some embodiments.
Figure 2B:
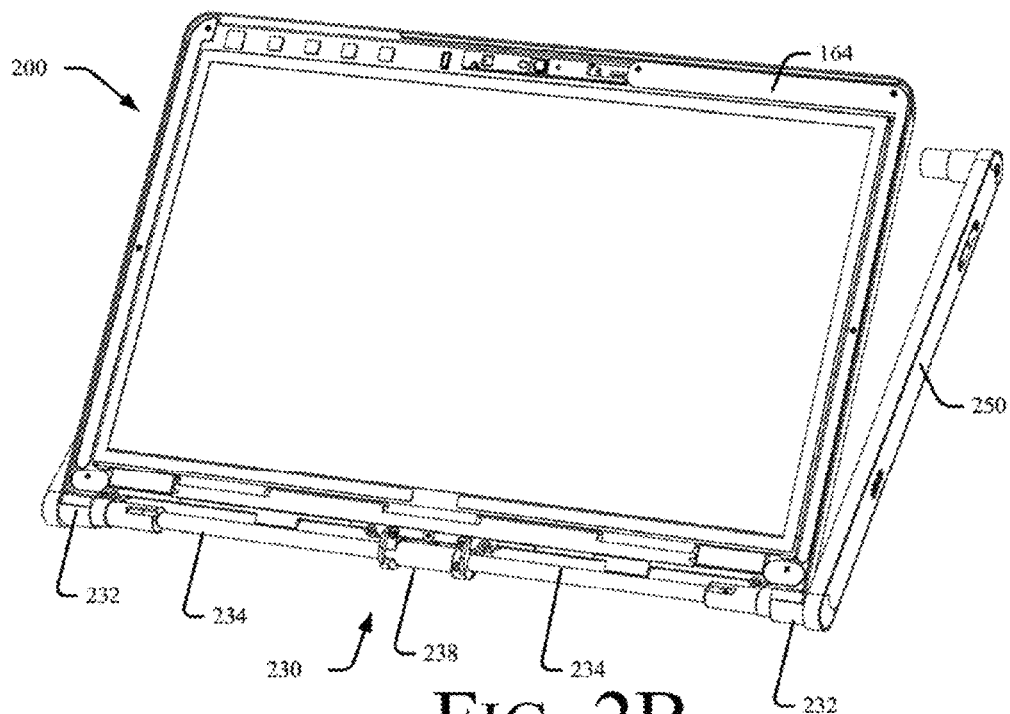

Referring first to FIGS. 2A-2B, in one embodiment an assembly 200 comprises a first hinge assembly 210 to be coupled to the first section 162 of the chassis 160 for the electronic device 100, a second hinge assembly 230 to be coupled to the second section 164 of the chassis 160 for the electronic device, a first rigid connecting member 250 to be coupled to the first hinge assembly 230 and the second hinge assembly 230, a first resistance element 218 to provide a first rotational resistance between the first hinge assembly 210 and a first end of the first rigid connecting member 250, and a first resistance element 238 to provide a second rotational resistance between the second hinge assembly 230 and a second end of the first rigid connecting member 250.

In greater detail, in the embodiments depicted in FIGS. 2A-2B the first hinge assembly 210 is adapted to be coupled to a first end of the first section 162 of the chassis. First hinge assembly 210 comprises bearings 212, torsion rods 214, a torsion spring 216, and friction element 218. In some embodiments the first hinge assembly 210 extends across the entire width of the first section 162 of chassis 160 as illustrated in FIG. 2A. In other embodiments the first hinge assembly may extend only partially across the width of the first section 162 of chassis 160. Torsion spring 216 applies a torque to facilitate opening the first hinge assembly 210.

The first hinge assembly 210 is coupled to a first rigid connecting member 250 and in some embodiments may be coupled to a second rigid connecting member 260. In the embodiments depicted in FIGS. 2A-2B the connecting members 250, 260 are implemented as rigid connecting arms. In alternate embodiments described below with reference to FIGS. 4A-4B the connecting members may be implemented as rigid plates.

The second hinge assembly 230 is to be coupled to a first end of the second section 164 of the chassis 160 for the electronic device 100. Second hinge assembly 230 comprises bearings 232, torsion rods 234, and friction element 238. In some embodiments the second hinge assembly 230 extends across the entire width of the second section 164 of chassis 160 as illustrated in FIG. 2A. In other embodiments the second binge assembly may extend only partially across the width of the second section 164 of chassis 160.

The second hinge assembly 230 is coupled to a first rigid connecting member 250 and in some embodiments may be coupled to a second rigid connecting member 260. The assembly 200 enables the second section 164 of the electronic device 100 to articulate and to rotate with respect to the first section 162 of the electronic device 100.

Figure 3A:
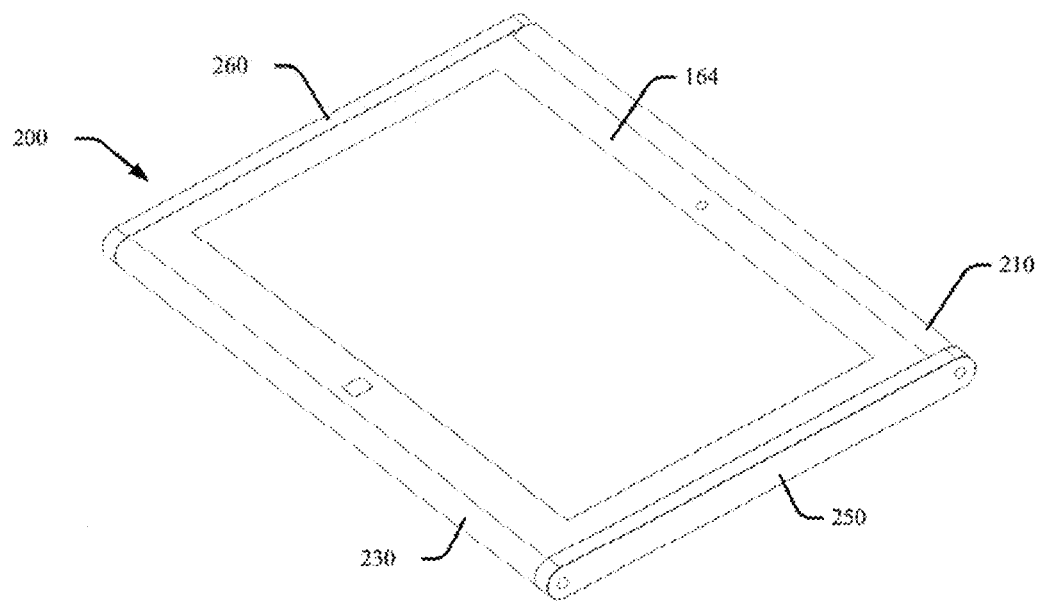
Figure 3B:
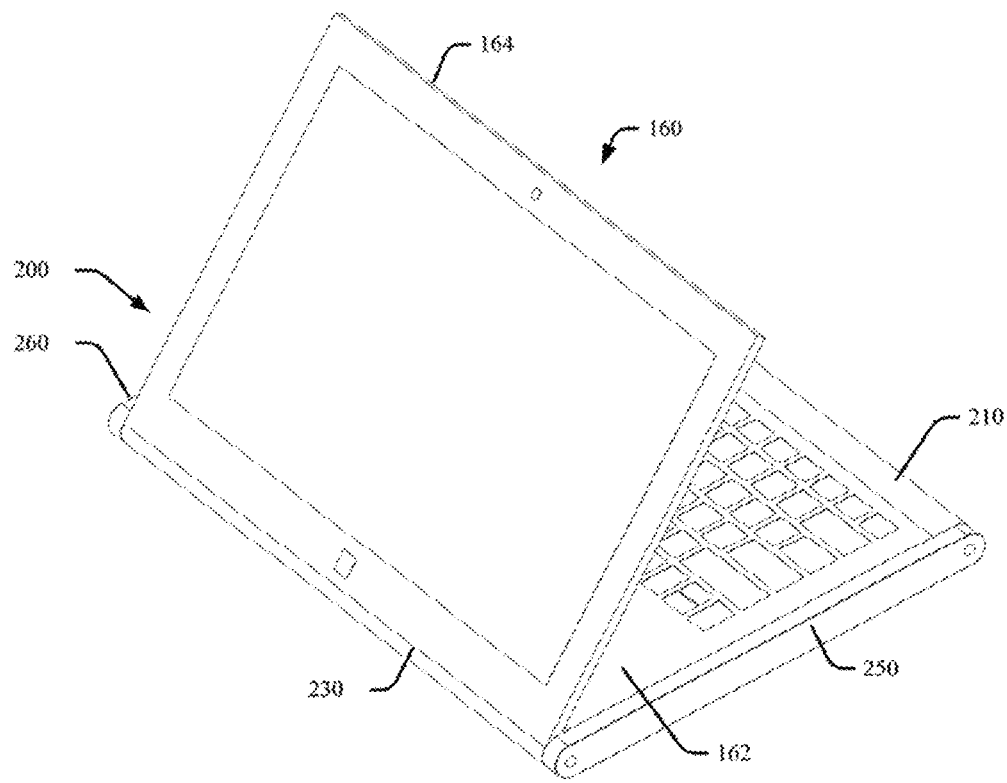

FIGS. 3A-3G illustrate the electronic device 160 in various different configurations made possible by the assembly 200. Referring to FIG. 3A, in a first configuration the first section 162 and the second section 164 of the electronic device 100 are substantially coplanar such that the electronic device 100 is positioned to be used as a tablet device. Referring to FIG. 3B, the second hinge assembly 230 enables the second section 164 of the electronic device 100 to rotate with respect to the first section 162 of the electronic device 160 between a first position, illustrated in FIG. 3A, and a second position in which the keyboard is accessible. In some embodiments the second resistance element 238 provides a rotational resistance to retain the second hinge assembly 230 in a fixed position between the first position and the second position. By way of example, the second friction element 238 may be implemented as a frictional engagement clip which snaps around at least one of the torsion shafts 234 to provide a rotational resistance to the torsion shaft(s) 234.

Figure 3C:
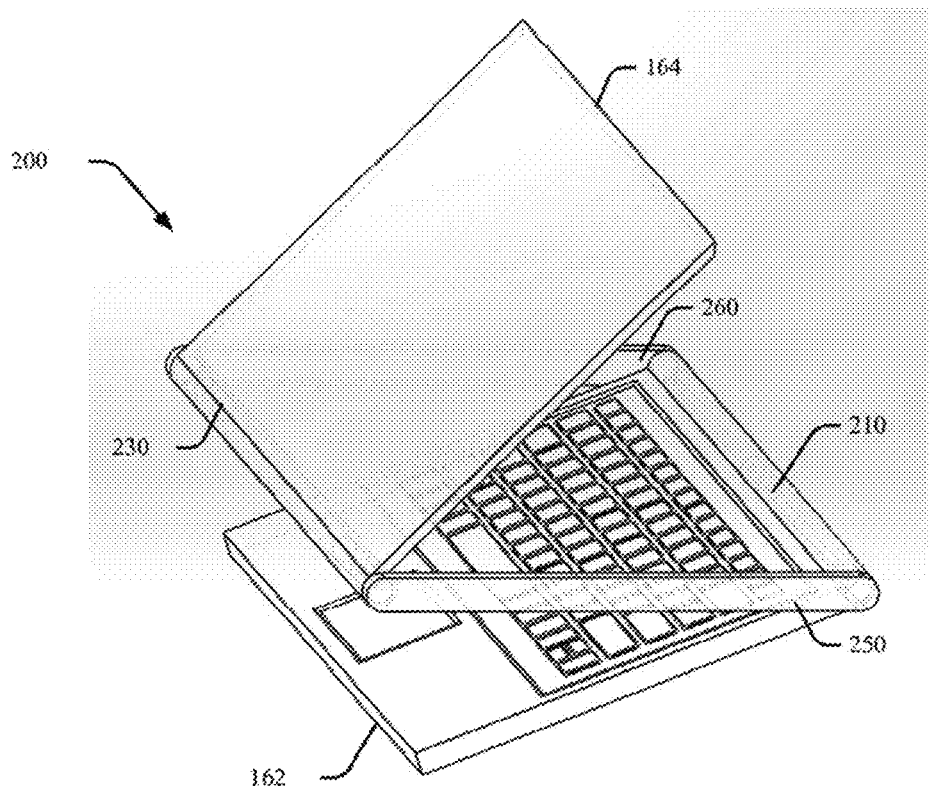
Figure 3D:
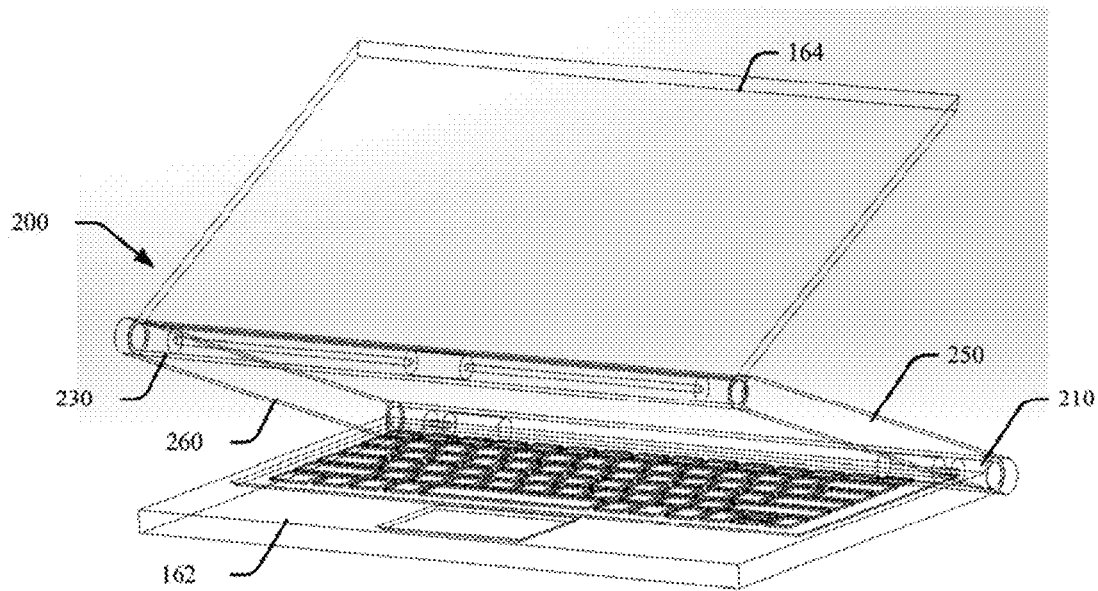

The first hinge assembly 210 is rotatable between a first position in which the first rigid connecting member 250 is positioned adjacent the second section of the chassis 160, as illustrated in FIGS. 3A-3B and a second position in which the first rigid connecting member 250 is displaced from the second section 164 of the chassis 160, as illustrated in FIGS. 3C-3D. In some embodiments the first resistance element 218 provides a rotational resistance to retain the first hinge assembly 210 in a fixed position between the first position and the second position. By way of example, the first friction element 218 may be implemented as a frictional engagement clip which snaps around at least one of the torsion shafts 214 to provide a rotational resistance to the torsion shaft(s) 214.

Figure 3E:
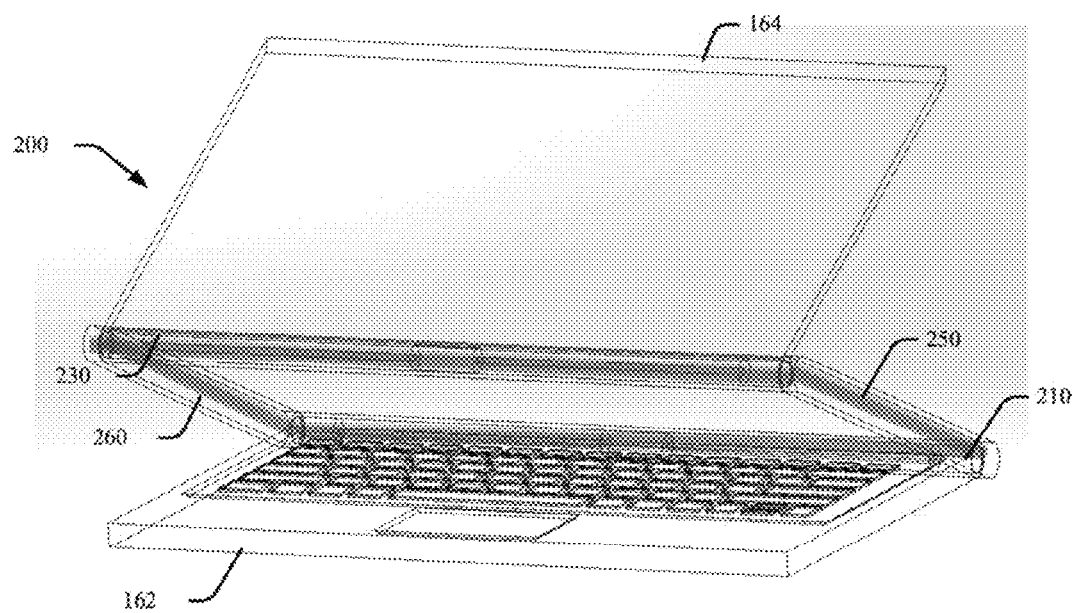
Figure 3F:
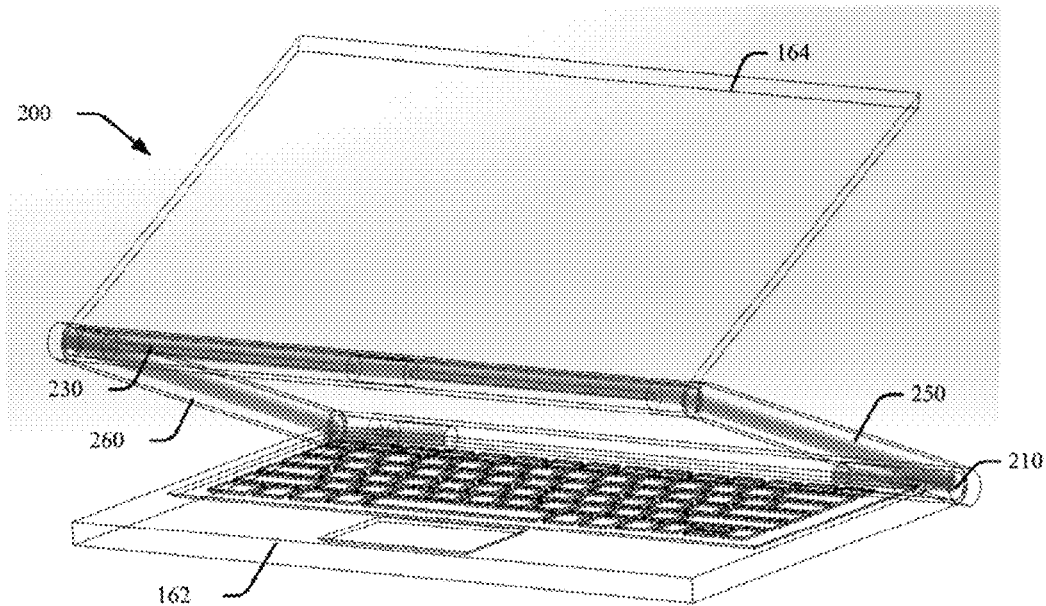

Referring to FIG. 3E, in some embodiments the first hinge assembly 210 extends along the entire width of the first section 162 of the electronic device 160, such that the assembly may be considered fully framed. In such embodiments the first hinge assembly 210 may utilize only a single resistance element 218. Referring to FIG. 3F, in some embodiments the first hinge assembly 210 does not extend along the entire width of the first section 162 of the electronic device 160, such that the assembly may be considered partially framed. In such embodiments the first hinge assembly 210 may utilize a third resistance element 218 a to provide a third rotational resistance between the first hinge assembly 210 and a first end of the first rigid connecting member 250.

Figure 3G:
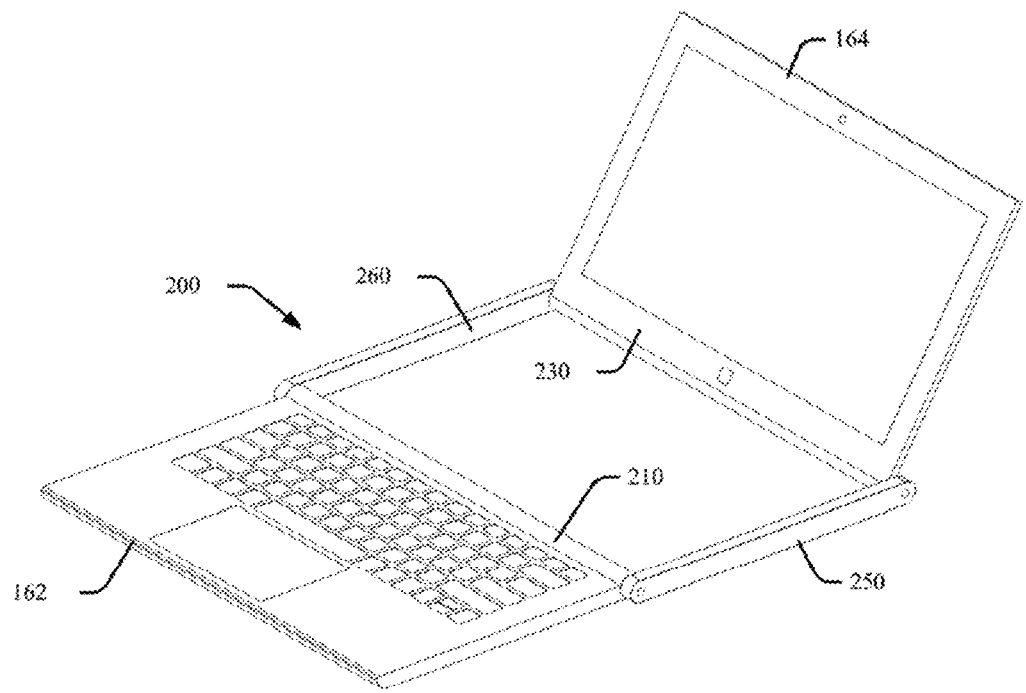
Figure 3H:
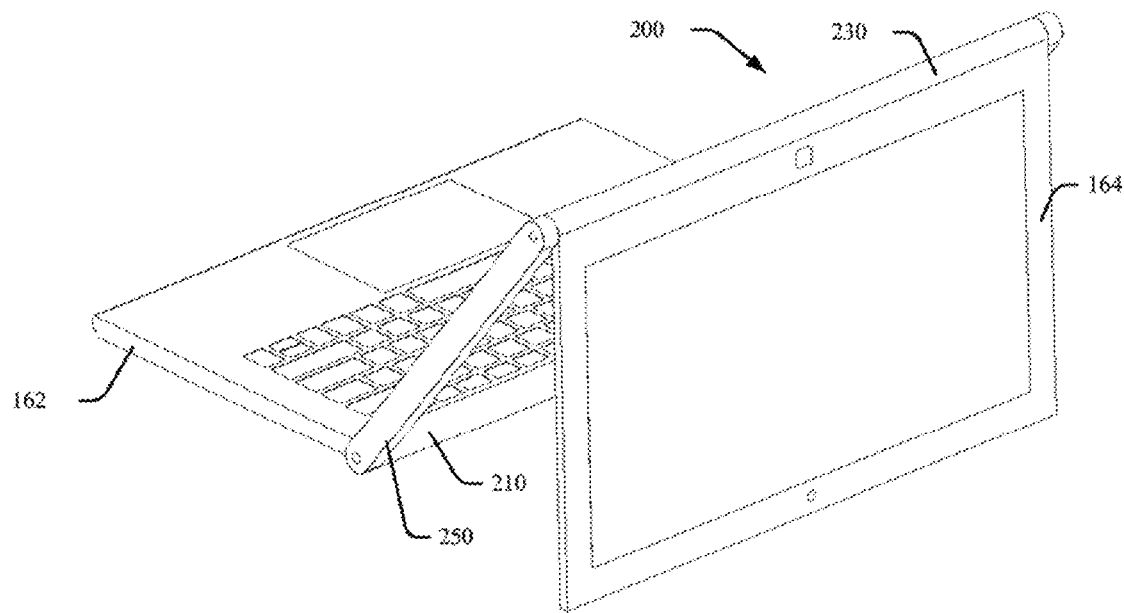

FIGS. 3G and 3H illustrate alternate configurations for electronic device 160. Referring to FIG. 3G, in some embodiments the first hinge assembly 210 allows the connecting member 250, 260 to rotate a full 180 degrees to an extended screen position, while FIG. 3H illustrates a shared screen position.

Figure 4A:
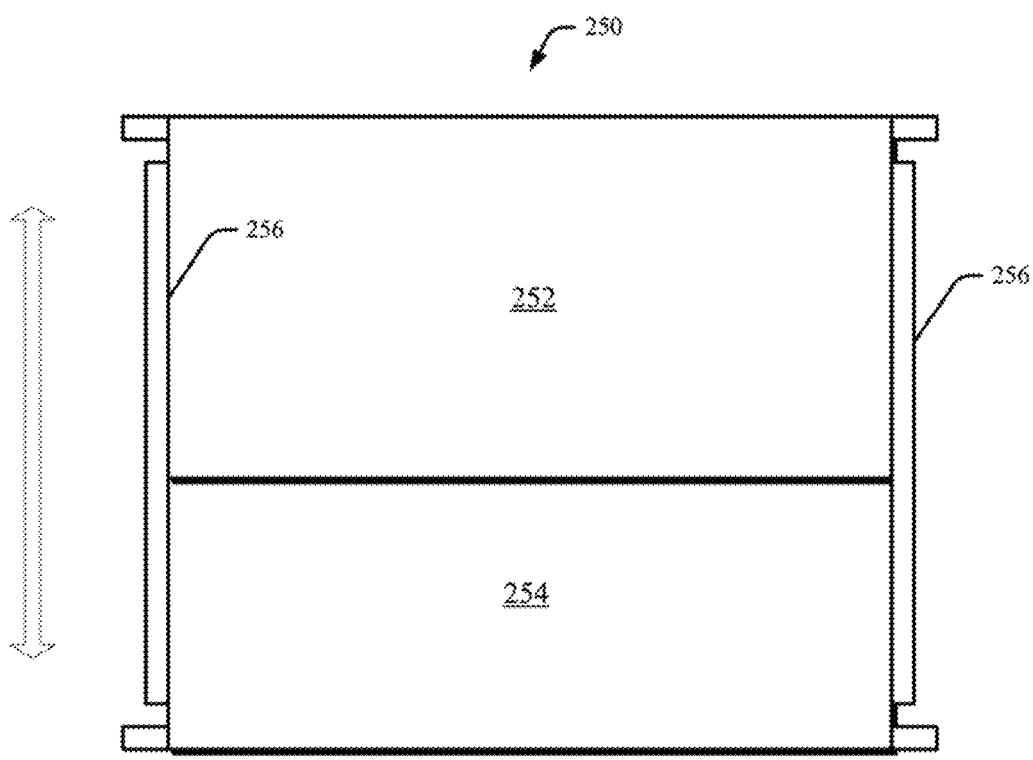
FIGS. 4A-4D are schematic illustrations of components of an assembly in accordance with embodiments.
Figure 4B:
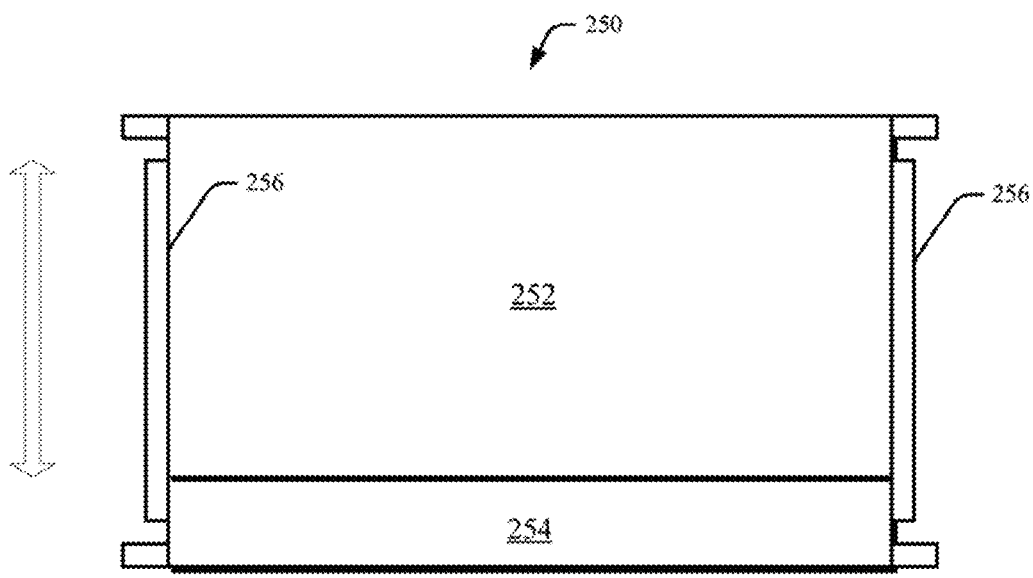
Figure 4C:
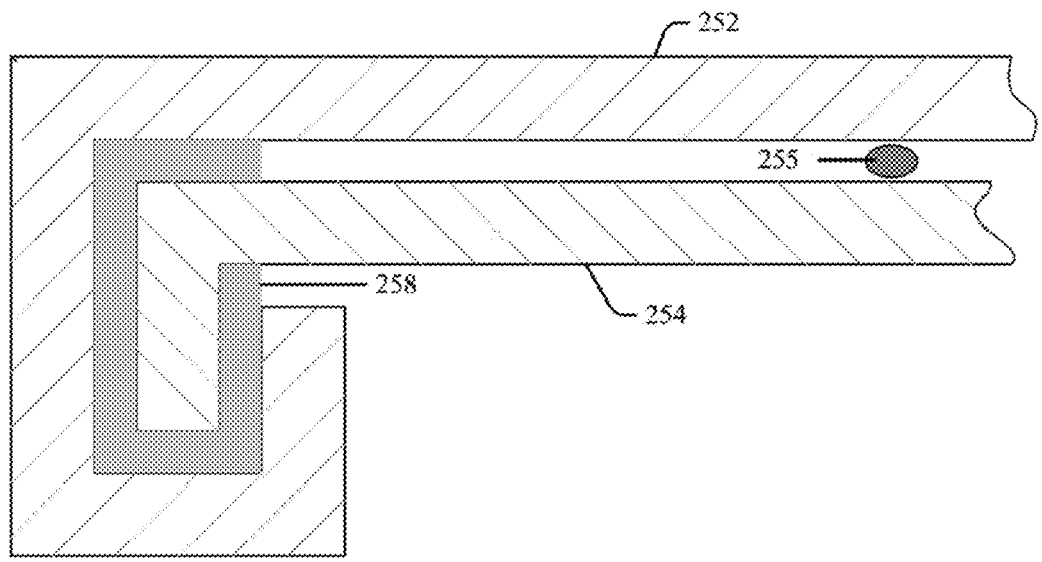
Figure 4D:
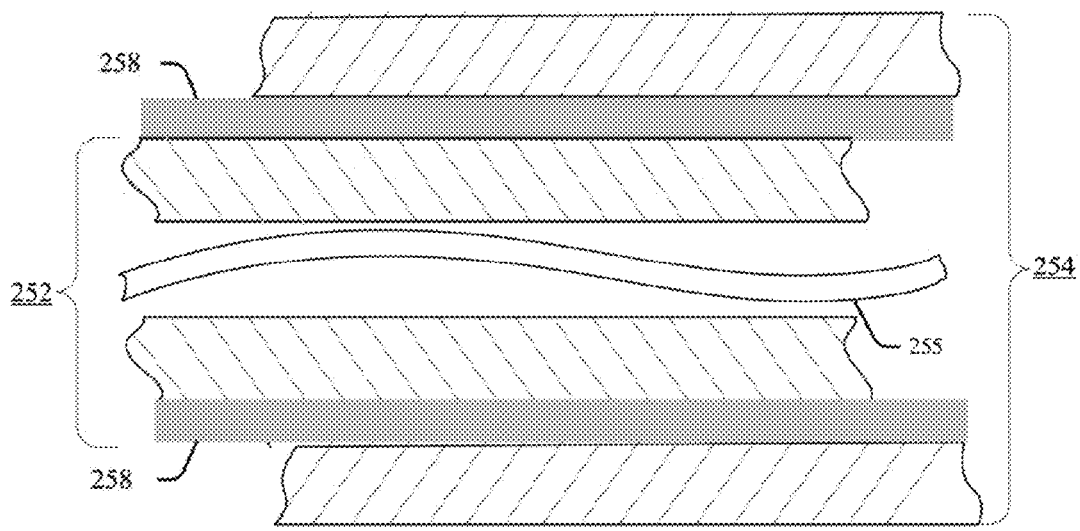

As mentioned above, in some embodiments the connecting member 250 may be replaced with a rigid connecting plate. FIGS. 4A-4D are schematic illustrations of a connecting member 250 in accordance with embodiments. Referring to FIGS. 4A-4D, in some embodiments the connecting member 250 may comprise a first plate 252 and a second plate 254 slidably engaged with the first plate 252 along tracks 256 between a first position, illustrated in FIG. 4A, in which the connecting member 250 is fully extended and a second position, illustrated in FIG. 4B, in which the connecting member 250 is retracted. This embodiment of connecting member 250 allows the connecting member 250 to have an adjustable height. Referring to FIG. 4C, in some embodiments a plastic liner 255 may be disposed between the first plate 252 and the second plate 254 to provide a degree of fictional resistance therebetween. Further, a cable 255 may be disposed between the first plate 252 and the second plate 254 to provide electrical connections to a display module. FIG. 4D illustrates an embodiment in which the first plate 252 is disposed within the second plate 254.

Figure 5A:
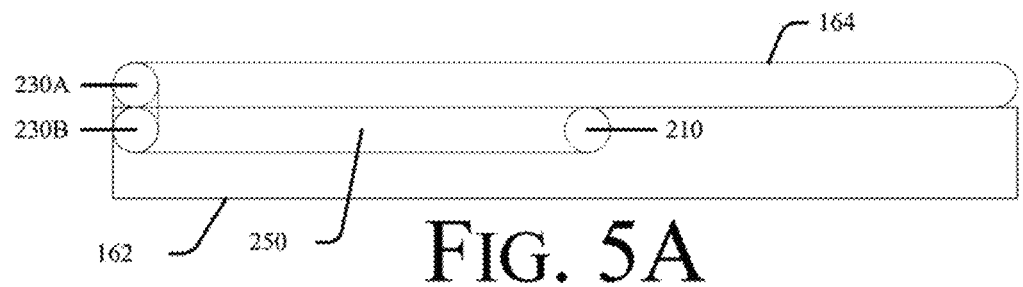
FIGS. 5A-5D are schematic illustrations of electronic devices which include assemblies in accordance, with some embodiments.
Figure 5B:
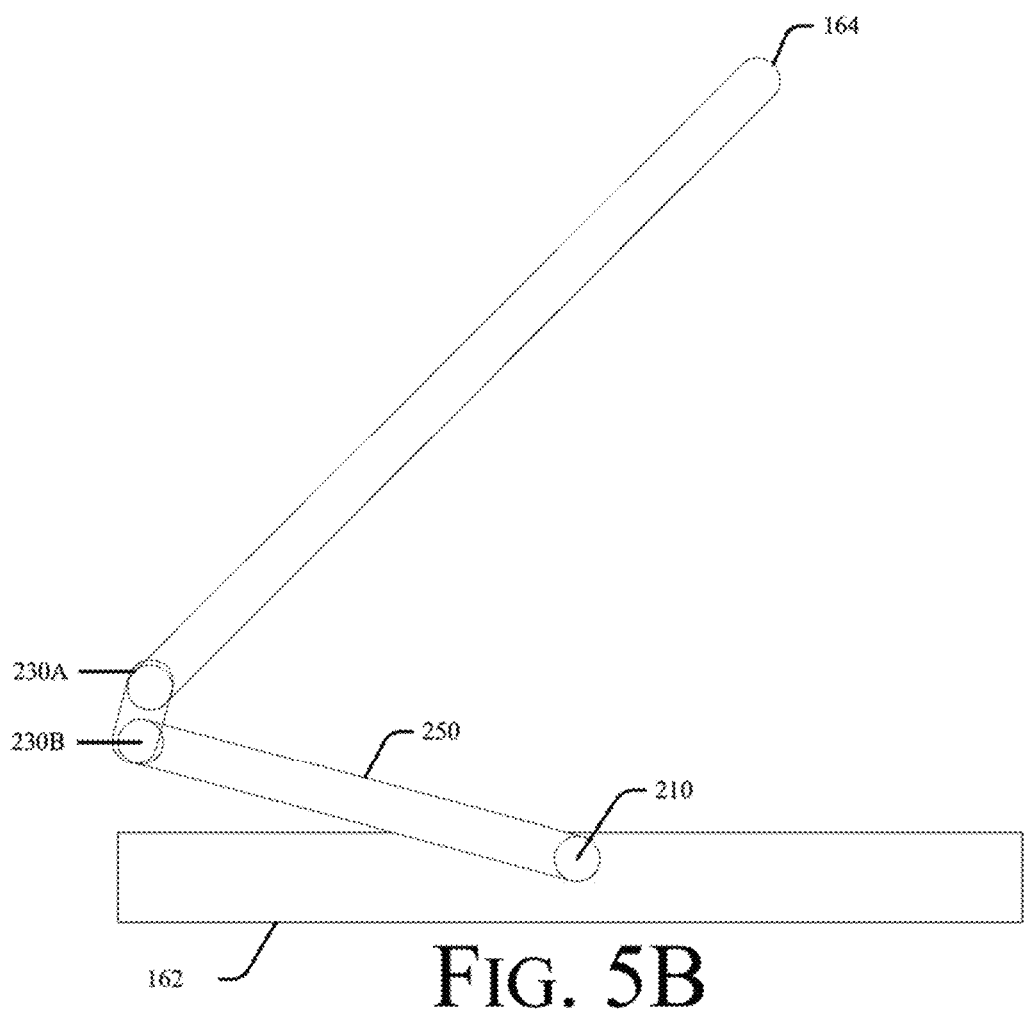
Figure 5C:
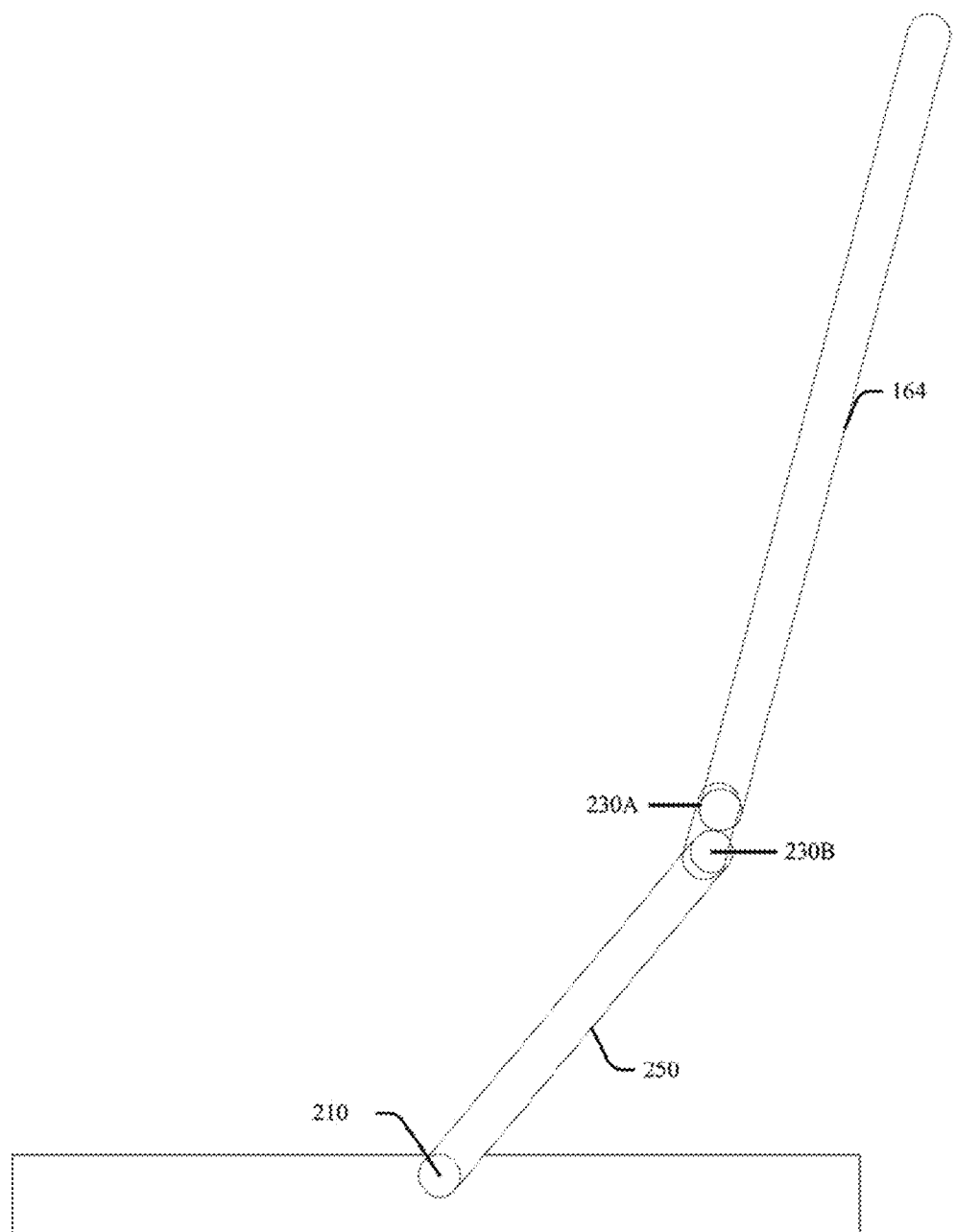
Figure 5D:
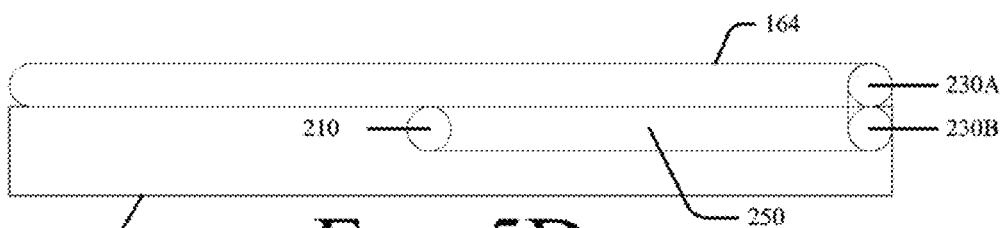

FIGS. 5A-5D illustrate configurations in which the first hinge assembly 210 is located in a position approximately in the center of the first section 162 of the chassis 160 of the electronic device 100. As illustrated in FIGS. 5A-5D, in some embodiments the first binge assembly 210 is rotatable through a range of approximately 180 degrees between a first position illustrated in FIG. 5A and a second position illustrated in FIG. 5D. FIGS. 5B and 5C illustrate intermediate positions.

In the embodiments depicted in FIGS. 5A-5D the second hinge assembly 230 is a dual-axis hinge assembly which includes a first hinge 230A and a second hinge 230B which enables the second section 164 of the chassis 160 of electronic device 100 to fold flat against the first section 162.

Figure 6:
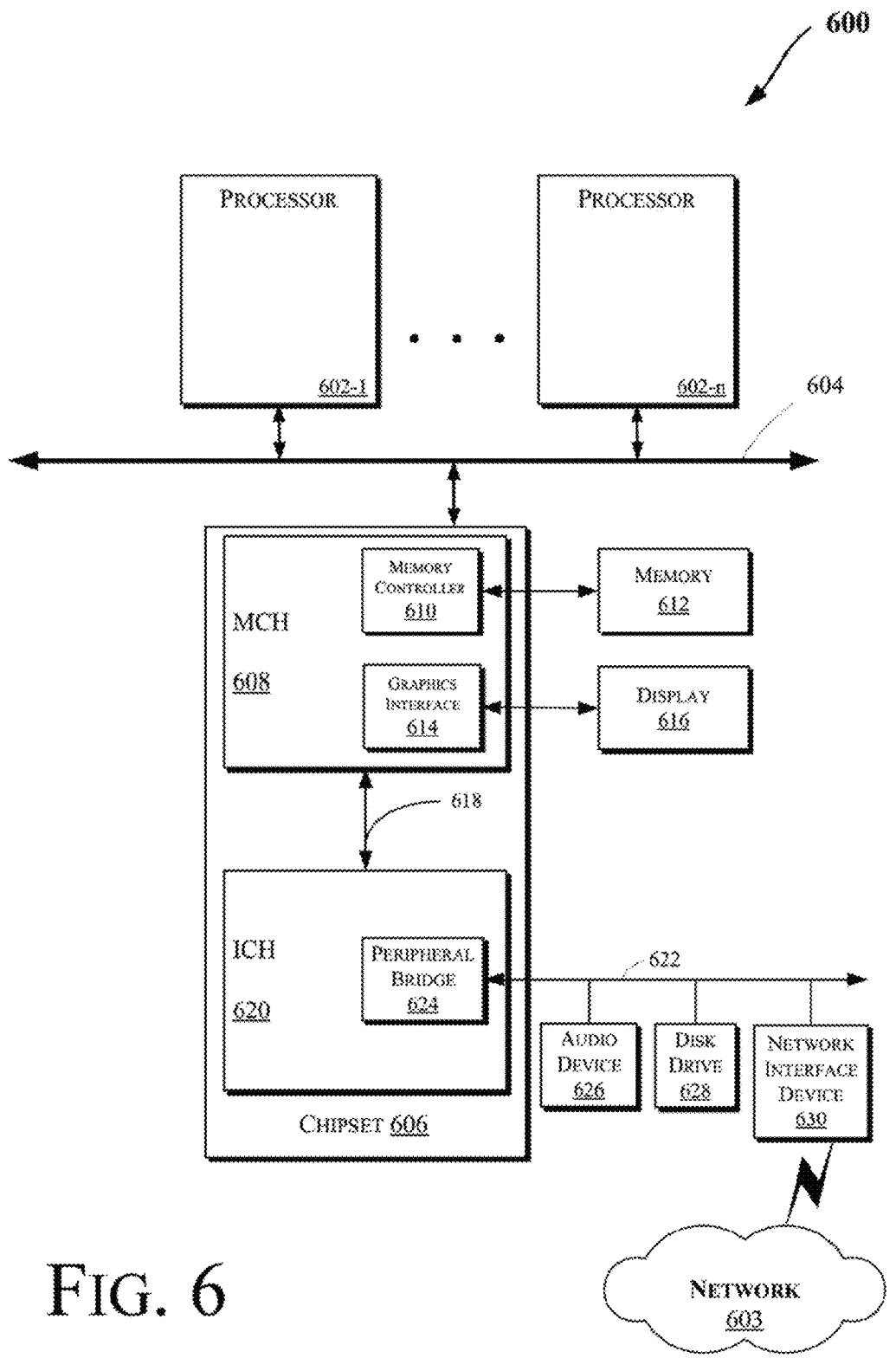
FIGS. 6-10 are schematic illustrations of electronic devices which may be modified to include a hinge assembly in accordance with some embodiments.

As described above, in some embodiments the electronic device may be embodied as a computer system. FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one embodiment of the invention, the graphics interlace 614 may communicate with the display device 616 via an accelerated graphics port (AGP), In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path, between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support, (e.g. digital, video interface (DVI), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and one or more other components discussed herein may be combined to form a single chip (e.g. to provide a System on Chip (SOC)), Furthermore, the graphics accelerator 616 may be included within the MCH 608 in other embodiments of the invention.

Furthermore, the computing system 600 may include volatile, and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
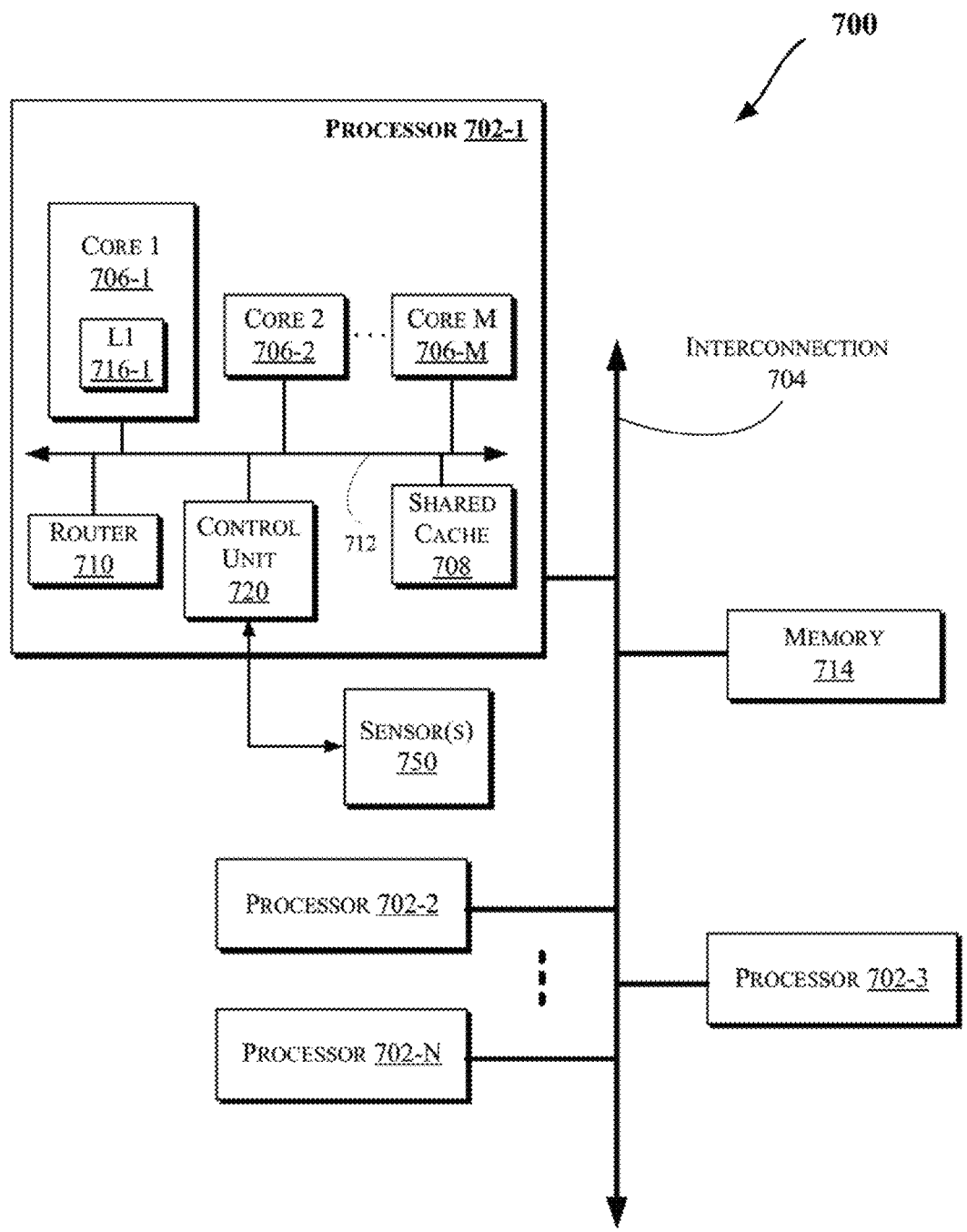

FIG. 7 illustrates a block diagram of a computing system 700, according to an embodiment of the invention. The system 700 may include one or more processors 702-1 through 702-N (generally referred to herein as "processors 702" or "processor 702"), The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an embodiment, the processor 702-1 may include one or more processor cores 706-1 through 706-M (referred to herein as "cores 706" or more generally as "core 706"), a shared cache 708, a muter 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one embodiment, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an embodiment, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some embodiments, one or more of the cores 706 may include a level 1 (L1) cache 716-1 (generally referred to herein as "L1 cache 716"). In one embodiment, the controller 720 may include logic to implement the operations described above with reference to FIG. 3.

Figure 8:
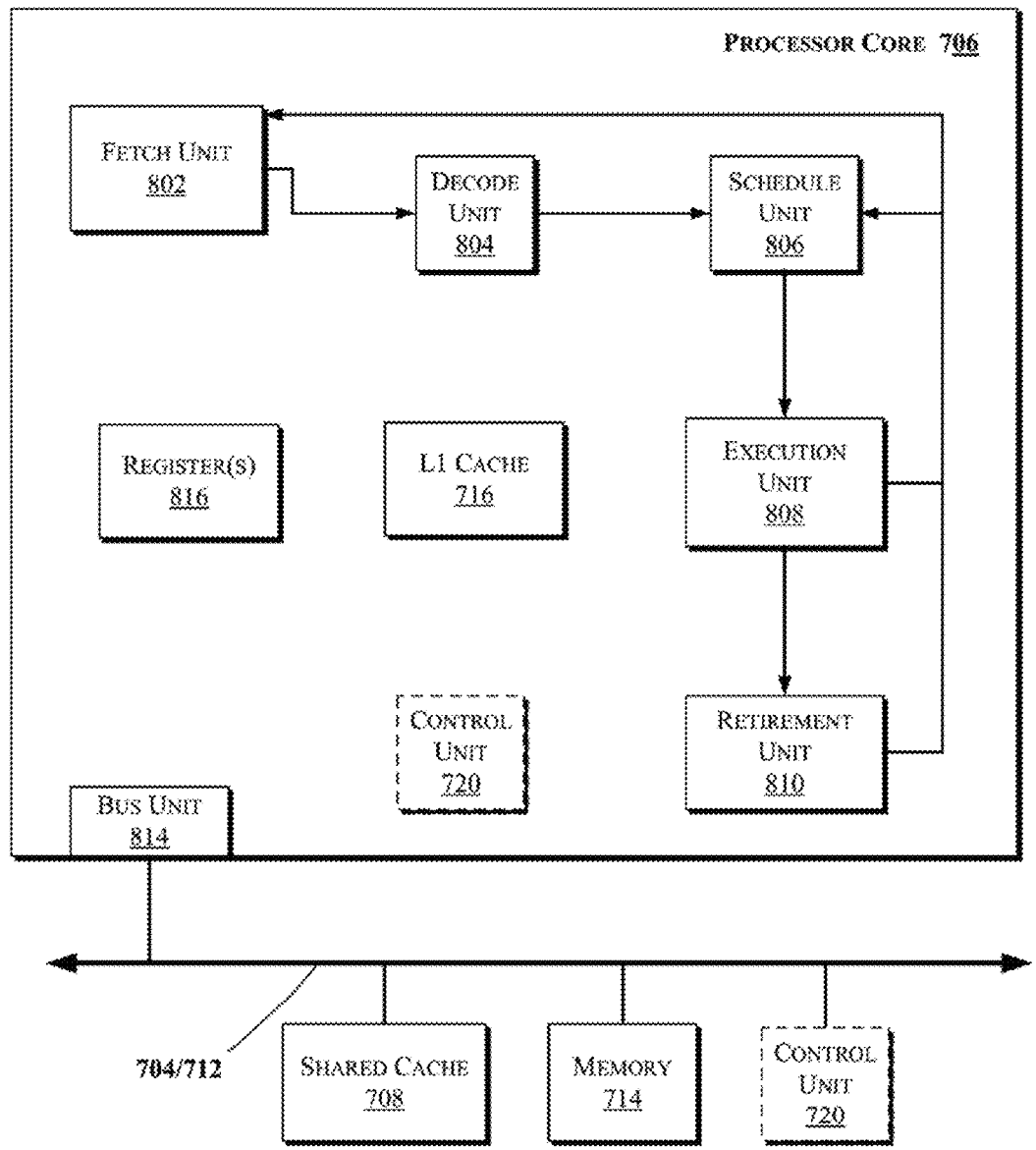

FIG. 8 illustrates a block diagram of portions of a processor core 706 and other components of a computing system, according to an embodiment of the invention. In one embodiment, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one embodiment, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an embodiment, the execution unit 808 may include more than one execution unit. The execution unit 808 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 808.

Further, the execution unit 808 may execute instructions out-of-order. Hence, the processor core 706 may be an out-of-order processor core in one embodiment. The core 706 may also include a retirement unit 810. The retirement unit 810 may retire executed instructions after they are committed. In an embodiment, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812), The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various embodiments the control unit 720 may be located elsewhere such as inside the core 706, coupled to the core via bus 704, etc.

Figure 9:
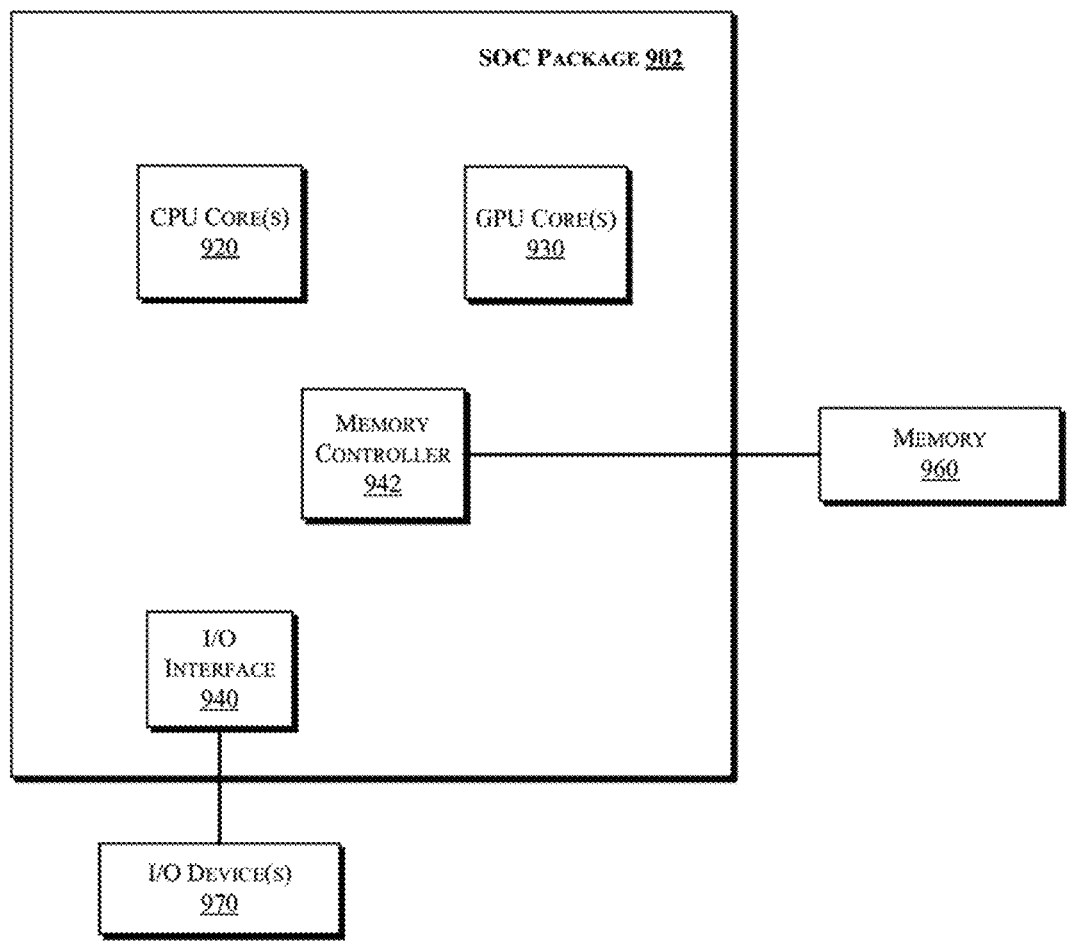

In some embodiments, one or more of the components discussed herein can be embodied as a System On Chip (SOC) device FIG. 9 illustrates a block diagram of an SOC package in accordance with an embodiment. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an embodiment, the memory 960 (or a portion of it) can be integrated on the SOC package 902.

The I/O interface 940 may be coupled to one or more I/O devices 970, e.g., via art interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
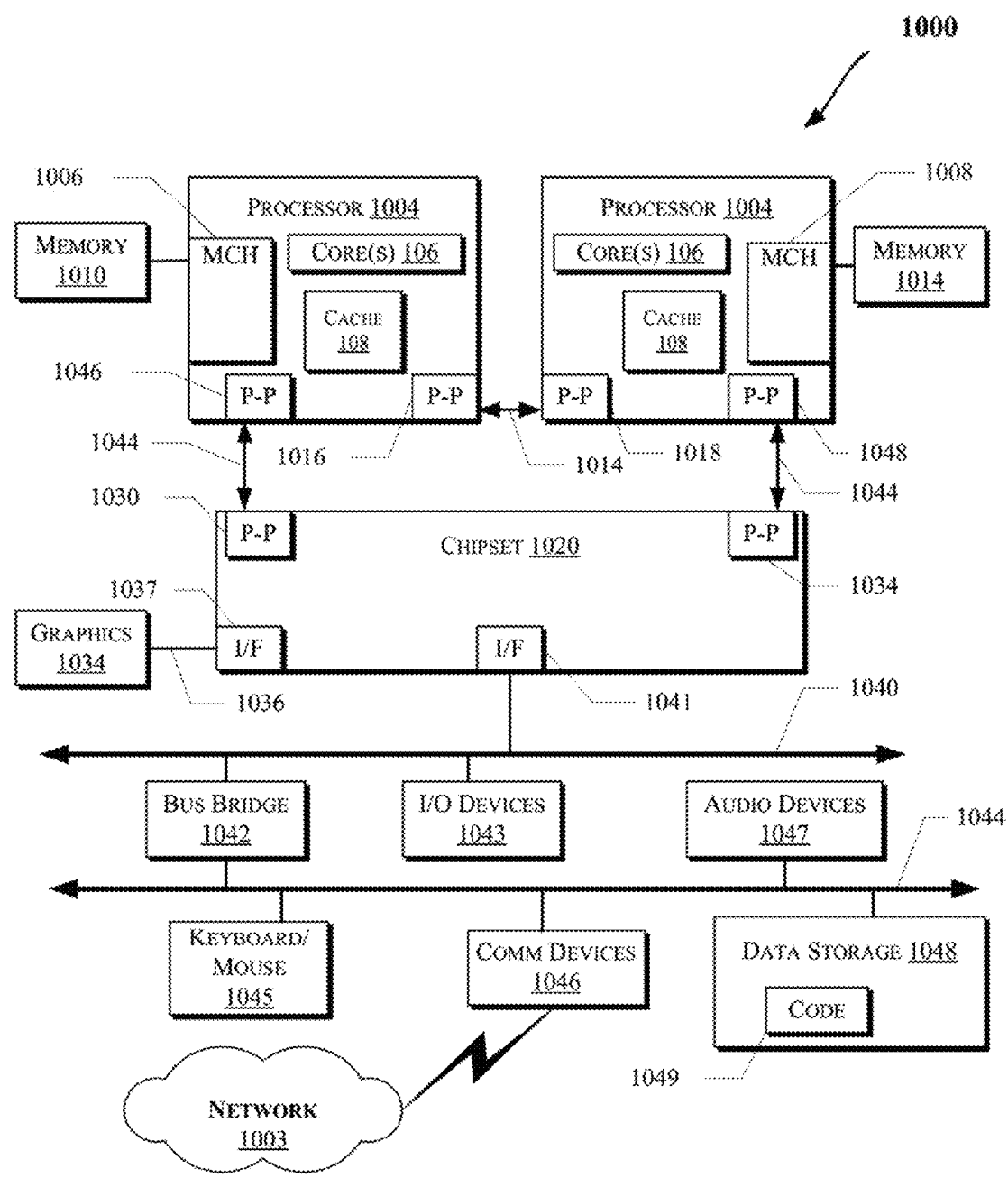

FIG. 10 illustrates a computing system 1000 that is arranged in a point-to-point (PtP) configuration, according to an embodiment of the invention. In particular, FIG. 10 shows a system where processors, memory, and input/output devices are interconnected by a number of point-to-point interfaces.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1030 and 1012. MCH 3006 and 1008 may include the memory controller 120 and/or logic 125 of FIG. 1 in some embodiments.

In an embodiment, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each, exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 30, one or more of the cores 106 and/or cache 108 of FIG. 1 may be located within the processors 1004. Other embodiments of the invention, however, may exist in other circuits, logic units, or devices within the system 1000 of FIG. 10. Furthermore, other embodiments of the invention may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further embodiments.

Example 1 is an assembly 200 to connect a first section 162 of a chassis 160 for an electronic device 100 to a second section 164 of a chassis 160 for an electronic device 100, comprising a first hinge assembly 210 to be coupled to the first section 162 of the chassis 160 for the electronic device 100, a second hinge assembly 230 to be coupled to the second section 364 of the chassis 160 for the electronic device, a first rigid connecting member 250 to be coupled to the first hinge assembly 210 and the second hinge assembly 230, a first resistance element 218 to provide a first rotational resistance between the first hinge assembly 210 and a first end of the first rigid connecting member 250, and a first resistance element 238 to provide a second rotational resistance between the second hinge assembly 230 and a second end of the first rigid connecting member 250.

In Example 2, the subject matter of Example 1 can optionally include a first hinge assembly 210 which is rotatable between a first position in which the first rigid connecting member 250 is positioned adjacent the first section 162 of the chassis 160 and a second position in which the first rigid connecting member 250 is displaced from the first section 162 of the chassis 160.

In Example 3, the subject matter of any one of Examples 1-2 can optionally include a first resistance element 218 which provides a rotational resistance to retain the first hinge assembly 210 in a fixed position between the first position and the second position.

In Example 4, the subject matter of any one of Examples 1-3 can optionally include a second hinge assembly 230 which is to be coupled to a first end of the second section 164 of the chassis 160 for the electronic device and is rotatable between a first position and a second position.

In Example 5, the subject matter of any one of Examples 1-4 can optionally include a second resistance element 238 which provides a rotational resistance to retain the second hinge assembly 230 in a fixed position between the first position and the second position.

In Example 6, the subject matter of any one of Examples 1-5 can optionally include a third resistance element 218 a to provide a third rotational resistance between the first hinge assembly 210 and a first end of the first rigid connecting member 250.

In Example 7, the subject matter of any one of Examples 1-6 can optionally include a first rigid connecting member 250 which comprises a first, plate and a second plate slidably engaged with the first plate.

In Example 8, the subject matter of any one of Examples 1-7 can optionally include a second rigid connecting member 260 to be coupled to the first hinge assembly 210 and the second hinge assembly.

Example 9 is a chassis for an electronic device, comprising a first section 162 and a second section and an assembly 200 to connect the first section 162 of the chassis 160 to the second section 164 of the chassis 160 for an electronic device 100, comprising a first hinge assembly 210 to be coupled to the first section 162 of the chassis 160 for the electronic device 100, a second hinge assembly 230 to be coupled to the second section 164 of the chassis 160 for the electronic device, a first rigid connecting member 250 to be coupled to the first hinge assembly 210 and the second hinge assembly 230, a first resistance element 218 to provide a first rotational resistance between the first binge assembly 210 and a first end of the first rigid connecting member 250, and a first resistance element 238 to provide a second rotational resistance between the second hinge assembly 230 and a second end of the first rigid connecting member 250.

In Example 10 the subject matter of Example 9 can optionally include a first hinge assembly 210 which is rotatable between a first position in which the first rigid connecting member 250 is positioned adjacent the first section 162 of the chassis 160 and a second position in which the first rigid connecting member 250 is displaced from the first section 162 of the chassis 160.

In Example 11, the subject matter of any one of Examples 9-10 can optionally include a first resistance element 218 which provides a rotational resistance to retain the first hinge assembly 210 in a fixed position between the first position and the second position.

In Example 12, the subject matter of any one of Examples 9-11 can optionally include a second hinge assembly 230 which is to be coupled to a first, end of the second section 164 of the chassis 160 for the electronic device and is rotatable between a first position and a second position.

In Example 13, the subject matter of any one of Examples 9-12 can optionally include a second resistance element 238 which provides a rotational resistance to retain the second hinge assembly 230 in a fixed position between the first position and the second position.

In Example 14, the subject matter of any one of Examples 9-13 can optionally include a third resistance element 218 a to provide a third rotational resistance between the first hinge assembly 210 and a first, end of the first rigid connecting member 250.

In Example 15, the subject matter of any one of Examples 9-14 can optionally include a first rigid connecting member 250 which comprises a first plate and a second plate slidably engaged with the first plate.

In Example 16, the subject matter of any one of Examples 9-15 can optionally include a second rigid connecting member 260 to be coupled to the first hinge assembly 210 and the second hinge assembly.

Example 17 is an electronic device, comprising at least one electronic component, a chassis comprising a first section 162 and a second section, and an assembly 200 to connect the first section 162 of the chassis 160 to the second section 164 of the chassis 160 for an electronic device 100, comprising a first hinge assembly 210 to be coupled to the first section 162 of the chassis 160 for the electronic device 100, a second hinge assembly 230 to be coupled to the second section 164 of the chassis 160 for the electronic device, a first rigid connecting member 250 to be coupled to the first hinge assembly 210 and the second hinge assembly 230, a first resistance element 218 to provide a first rotational resistance between the first hinge assembly 210 and a first end of the first rigid connecting member 250, and a first resistance, element 238 to provide a second rotational resistance between the second hinge assembly 230 and a second end of the first rigid connecting member 250.

In Example 18, the subject matter of Example 17 can optionally include a first hinge assembly 210 which is rotatable between a first position in which the first rigid connecting member 250 is positioned adjacent the first section 162 of the chassis 160 and a second position in which the first rigid connecting member 250 is displaced from the first section 162 of the chassis 160.

In Example 19, the subject matter of any one of Examples 17-18 can optionally include a first resistance element 218 which provides a rotational resistance to retain the first hinge assembly 210 in a fixed position between the first position and the second position.

In Example 20, the subject matter of any one of Examples 17-19 can optionally include a second hinge assembly 230 which is to be coupled to a first end of the second section 164 of the chassis 160 for the electronic device and is rotatable between a first position and a second position.

In Example 21, the subject matter of any one of Examples 17-20 can optionally include a second resistance element 238 which provides a rotational resistance to retain the second hinge assembly 230 in a fixed position between the first position and the second position.

In Example 22, the subject matter of any one of Examples 17-21 can optionally include a third resistance element 218 a to provide a third rotational resistance between the first hinge assembly 210 and a first end of the first rigid connecting member 250.

In Example 23, the subject, matter of any one of Examples 17-22 can optionally include a first rigid connecting member 250 which comprises a first plate and a second plate slidably engaged with the first plate.

In Example 24, the subject matter of any one of Examples 17-23 can optionally include a second rigid connecting member 260 to be coupled to the first hinge assembly 210 and the second hinge assembly.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An assembly to connect a first section of a chassis for an electronic device to a second section of a chassis for the electronic device, comprising:
   a first hinge assembly to be coupled to the first section of the chassis for the electronic device;
   a second hinge assembly to be coupled to the second section of the chassis for the electronic device;
   a first rigid connecting member to be coupled to the first hinge assembly and the second hinge assembly;
   a first resistance element comprising a torsion spring and a friction element to provide a first rotational resistance between the first hinge assembly and a first end of the first rigid connecting member; and
   a second resistance element to provide a second rotational resistance between the second hinge assembly and a second end of the first rigid connecting member,
   wherein the first rigid connecting member comprises a first plate and a second plate slidably engaged with the first plate between a first position in which the connecting member is fully extended and a second position in which the connecting member is retracted, wherein the first plate is disposed within the second plate, and
   wherein a cable is disposed between the first plate and the second plate to provide electrical power to a display module.

2. The assembly of claim 1, wherein:
   the first hinge assembly is rotatable between a first position in which the first rigid connecting member is positioned adjacent the first section of the chassis and a second position in which the first rigid connecting member is displaced from the first section of the chassis.

3. The assembly of claim 2, wherein:
   the first resistance element provides a rotational resistance to retain the first hinge assembly in a fixed position between the first position and the second position.

4. The assembly of claim 1, wherein:
   the second hinge assembly is to be coupled to a first end of the second section of the chassis for the electronic device and is rotatable between a first position and a second position.

5. The assembly of claim 4, wherein:
   the second resistance element provides a rotational resistance to retain the second hinge assembly in a fixed position between the first position and the second position.

6. The assembly of claim 1, further comprising a third resistance element to provide a third rotational resistance between the first hinge assembly and a first end of the first rigid connecting member.

7. A chassis for an electronic device, comprising:
   a first section and a second section; and
   an assembly to connect the first section of the chassis to the second section of the chassis for an electronic device, comprising:
   a first hinge assembly to be coupled to the first section of the chassis for the electronic device;
   a second hinge assembly to be coupled to the second section of the chassis for the electronic device;
   a first rigid connecting member to be coupled to the first hinge assembly and the second hinge assembly;
   a first resistance element comprising a torsion spring and a friction element to provide a first rotational resistance between the first hinge assembly and a first end of the first rigid connecting member; and
   a second resistance element to provide a second rotational resistance between the second hinge assembly and a second end of the first rigid connecting member,
   wherein the first rigid connecting member comprises a first plate and a second plate slidably engaged with the first plate between a first position in which the connecting member is fully extended and a second position in which the connecting member is retracted, wherein the first plate is disposed within the second plate, and
   wherein a cable is disposed between the first plate and the second plate to provide electrical power to a display module.

8. The chassis of claim 7, wherein:
   the first hinge assembly is rotatable between a first position in which the first rigid connecting member is positioned adjacent the first section of the chassis and a second position in which the first rigid connecting member is displaced from the first section of the chassis.

9. The chassis of claim 8, wherein:
   the first resistance element provides a rotational resistance to retain the first hinge assembly in a fixed position between the first position and the second position.

10. The chassis of claim 7, wherein:
    the second hinge assembly is to be coupled to a first end of the second section of the chassis for the electronic device and is rotatable between a first position and a second position.

11. The chassis of claim 10, wherein:
    the second resistance element provides a rotational resistance to retain the second hinge assembly in a fixed position between the first position and the second position.

12. The chassis of claim 7, further comprising a third resistance element to provide a third rotational resistance between the first hinge assembly and a first end of the first rigid connecting member.

13. An electronic device, comprising:
    at least one electronic component;
    a chassis comprising a first section and a second section; and
    an assembly to connect the first section of the chassis to the second section of the chassis for an electronic device, comprising:

a first hinge assembly to be coupled to the first section of the chassis for the electronic device;

a second hinge assembly to be coupled to the second section of the chassis for the electronic device;

a first rigid connecting member to be coupled to the first hinge assembly and the second hinge assembly;

a first resistance element comprising a torsion spring and a friction element to provide a first rotational resistance between the first hinge assembly and a first end of the first rigid connecting member; and a second resistance element to provide a second rotational resistance between the second hinge assembly and a second end of the first rigid connecting member, wherein the first rigid connecting member comprises a first plate and a second plate slidably engaged with the first plate between a first position in which the connecting member is fully extended and a second position in which the connecting member is retracted, wherein the first plate is disposed within the second plate, and wherein a cable is disposed between the first plate and the second plate to provide electrical power to a display module.

14. The electronic device of claim 13, wherein:
the first hinge assembly is rotatable between a first position in which the first rigid connecting member is positioned adjacent the first section of the chassis and a second position in which the first rigid connecting member is displaced from the first section of the chassis.

15. The electronic device of claim 14, wherein:
the first resistance element provides a rotational resistance to retain the first hinge assembly in a fixed position between the first position and the second position.

16. The electronic device of claim 13, wherein:
the second hinge assembly is to be coupled to a first end of the second section of the chassis for the electronic device and is rotatable between a first position and a second position.

17. The electronic device of claim 16, wherein:
the second resistance element provides a rotational resistance to retain the second hinge assembly in a fixed position between the first position and the second position.

18. The electronic device of claim 13, further comprising a third resistance element to provide a third rotational resistance between the first hinge assembly and a first end of the first rigid connecting member.

* * * * *